United States Patent

Seder

[11] Patent Number: 5,211,467
[45] Date of Patent: May 18, 1993

[54] FLUORESCENT LIGHTING SYSTEM

[75] Inventor: Thomas A. Seder, Cedar Rapids, IA

[73] Assignee: Rockwell International Corporation, Seal Beach, Calif.

[21] Appl. No.: 817,706

[22] Filed: Jan. 7, 1992

[51] Int. Cl.$^5$ .......................... F21V 7/22; F21V 9/00; F21V 9/16

[52] U.S. Cl. ...................................... 362/84; 362/260; 362/293

[58] Field of Search .................. 362/217, 260, 84, 293, 362/296, 341

[56] References Cited

U.S. PATENT DOCUMENTS

| | | | |
|---|---|---|---|
| 1,313,622 | 8/1919 | Dodds | 362/84 |
| 1,847,134 | 3/1932 | Nikonow | 362/84 |
| 2,213,868 | 9/1940 | Lucian | 362/84 X |
| 2,259,416 | 10/1941 | Gardner | 362/84 |
| 2,702,862 | 2/1955 | Finney | 362/84 X |
| 4,744,012 | 5/1988 | Bergkvist | 362/84 |
| 4,912,605 | 3/1990 | Whitehead | 362/84 X |

Primary Examiner—Richard R. Cole
Attorney, Agent, or Firm—John C. McFarren

[57] ABSTRACT

A long life fluorescent lighting system provides uniform white light illumination with high efficiency. The system includes a gas-filled lamp with no phosphors on the inside surface of the lamp. A diffuser plate or mirror external to the lamp includes a phosphor coating to convert ultraviolet radiation emitted by the lamp to uniform white light illumination. The lamp may be filled with mercury vapor enriched with $^{196}$Hg for emission of 254 nm wavelength ultraviolet radiation and minimization of radiation trapping. The system may include band pass reflectors for reflecting 254 nm radiation to the phosphors and reflecting unwanted 185 nm radiation away from the phosphors and back into the lamp. The system provides uniform, high efficiency white light output suitable for back illumination of liquid crystal displays.

10 Claims, 1 Drawing Sheet

FLUORESCENT LIGHTING SYSTEM

TECHNICAL FIELD

The present invention relates to fluorescent lamps and, in particular, to a long life, high efficiency fluorescent lighting system in which the phosphorus are coated on a plate or mirror external to the lamp.

BACKGROUND OF THE INVENTION

Existing fluorescent lamps have limitations in performance and lifetime that are undesirable in certain applications, such as providing back light for liquid crystal displays (LCDs). A typical mercury vapor (Hg) fluorescent lamp includes a phosphor coating on the inside surface of a glass tube. When the Hg vapor is ionized inside the tube, the lamp discharge emits radiation, including ultraviolet at a wavelength of 254 nm, that is converted to visible light by the phosphor coating.

The performance of a standard fluorescent lamp suffers from several shortcomings inherent in its basic design. In particular, the phosphor coating on the inside surface of a fluorescent tube is exposed to ion bombardment from the lamp discharge and to degrading radiation at a wavelength of 185 nm. This exposure to ions and radiation erodes the phosphors and causes undesirable color center formation. Furthermore, the unwanted radiation at 185 nm is merely wasted energy that lowers the overall efficiency of the lamp. The life of the phosphor coating can be extended by using a thicker phosphor layer. However, a thick phosphor layer reflects light much better than it transmits light. Thus, in applying the phosphor coating to the inside of a fluorescent tube, there is a trade-off between a thin coating that transmits light more efficiently versus a thick coating that provides a greater lifetime.

The less than optimum performance of conventional fluorescent lamps is particularly manifest in LCDs where high efficiency and long life are highly desirable. Furthermore, the light from existing fluorescent lamps is diffused rather inefficiently with reflectors and diffusers to attain the uniform illumination needed for LCDs. Thus, there is a need for a high efficiency, long life fluorescent lighting system that provides a uniform white light output.

SUMMARY OF THE INVENTION

The present invention comprises a high efficiency, long life, fluorescent lighting system. The system includes a gas-filled lamp, comprising a glass or quartz tube, without a phosphor coating on the inside surface of the lamp. A diffuser plate or mirror external to the quartz lamp includes a coating of phosphors to convert ultraviolet radiation emitted by the lamp to uniform white light illumination. The lamp may be filled with mercury vapor enriched with $^{196}$Hg, for example, to emit radiation primarily at a wavelength of 254 nm and to minimize radiation trapping. The system may include reflectors for reflecting 254 nm radiation to the phosphors and reflecting unwanted 185 nm radiation away from the phosphors and back into the lamp.

A principal object of the invention is to provide uniform white light illumination from a highly efficient source. A feature of the invention is a fluorescent lighting system comprising a gas-filled quartz tube lamp and a phosphor coated plate or mirror external to the lamp. An advantage of the invention is a long life source light suitable for back illumination of liquid crystal displays.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Figure 1:
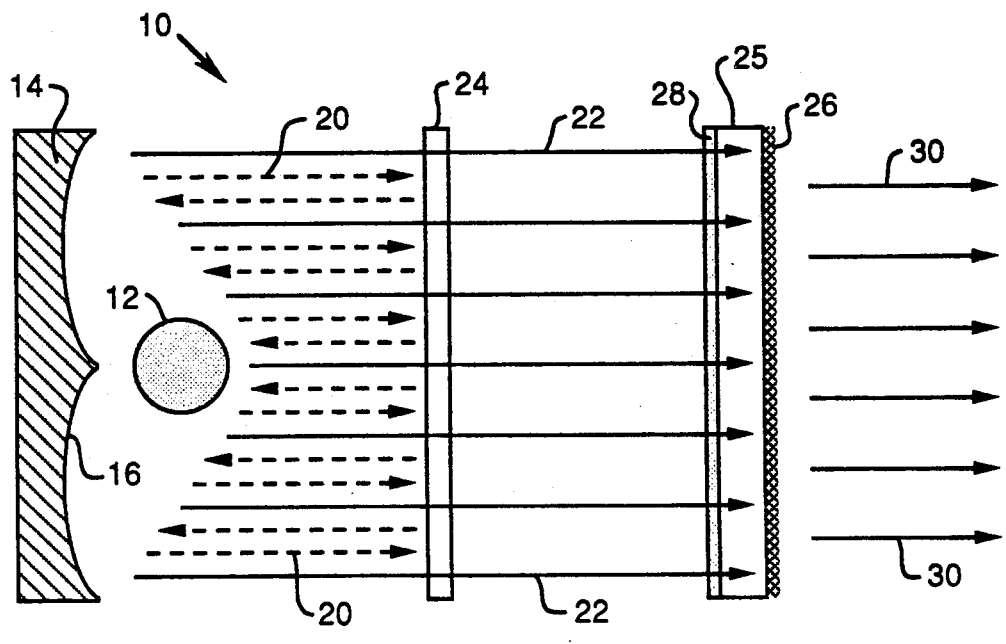
FIG. 1 is a diagrammatic side view of a fluorescent light system of the present invention in which the phosphors are coated on a plate external to the lamp.

The present invention comprises a fluorescent lighting system that provides uniform white light illumination with high efficiency during a long lifetime. A typical embodiment of the invention is illustrated in FIG. 1 as a diagrammatic side view. Lighting system 10 includes a gas-filled lamp 12, generally in the form of a cylindrical tube. Lamp 12 may comprise a glass or quartz tube, for example (i.e., a tube transparent to ultraviolet radiation), but without the conventional coating of phosphors on the inside surface of the lamp. Lamp 12 contains an ionizable gas, such as mercury vapor. The vapor may be enriched with $^{196}$Hg, for example, to emit radiation primarily at a wavelength of 254 nm upon electrical discharge and to minimize radiation trapping.

Radiation emitted by lamp 12 is reflected by a mirror 14 (or plurality of mirrors) that may have a curved surface 16. Surface 16 is shaped (parabolic, for example) to reflect light in the desired direction and pattern, as is well known in the art, depending on the shape and characteristics of lamp 12 and the desired pattern of illumination. As illustrated in FIG. 1, radiation is emitted by lamp 12 and reflected by mirror 14 in a direction indicated by arrows 20 and 22, representing the primary wavelengths emitted by lamp 12. In FIG. 1, dashed arrows 20 represent radiation at a wavelength of 185 nm and solid arrows 22 represent radiation at a wavelength of 254 nm.

The radiation emitted by lamp 12 and reflected by mirror 14 strikes a band pass reflector 24 (such as a vuv grade MgF$_2$ coated reflector, for example) designed to reflect radiation at 185 nm wavelength back to lamp 12, as indicated by dashed arrows 20. Radiation at 254 nm wavelength is passed by reflector 24, as indicated by arrows 22, to a phosphordiffuser plate 25. Plate 25 may comprise a material, such as Corning No. 9741 quartz, for example, that transmits radiation at 254 nm and absorbs radiation at 185 nm. Plate 25 is coated with any phosphor 26 that is stimulated by radiation at 254 nm light), as represented by arrows 30. In system 10, reflector 24 may be omitted if the particular phosphors comprising coating 26 are immune to color center development. For greater efficiency, the back side of plate 25 may include a coating 28 that transmits uv radiation to phosphor coating 26 but reflects RGB radiation emitted by the phosphors. As result, plate 25 emits a uniform distribution of white light.

A disadvantage of the design of lighting system 10 is that phosphor coating 26 reflects light more readily than it transmits light, as explained above. Therefore, system 10 has less than optimum efficiency, particularly if a thicker phosphor coating 26 is needed for long life operation. An improvement on the basic design of lighting system 10 is illustrated in FIG. 2.

Figure 2:
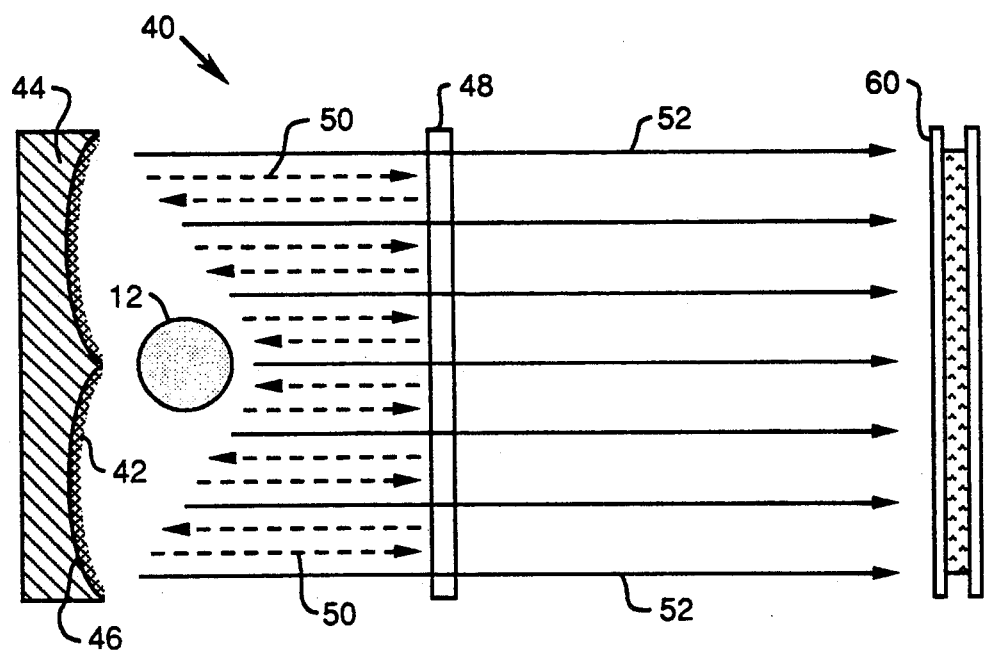
FIG. 2 is a diagrammatic side view of a fluorescent lighting system of the present invention in which the phosphors are coated on a mirror external to the lamp.

FIG. 2 is a diagrammatic side view of a fluorescent lighting system 40 that is similar to system 10 except that a phosphor coating 42 is applied to the reflective surface 46 of a mirror 44 (or plurality of mirrors) instead of an external diffuser plate, such as plate 25. Radiation emitted by lamp 11 at 254 nm wavelength is converted to RGB (white) light by phosphors 42 and reflected outwardly by mirror 44, as represented by arrows 50 and 52. A band pass reflector 48 is positioned opposite lamp 12 from mirror 44 to transmit white light 52 but reflect ultraviolet radiation, represented by dashed arrows 50, so as to bathe phosphor coating 42 with 254 nm wavelength radiation. Lighting system 40 has optimum efficiency because phosphor coating 46 is placed to reflect radiation rather than transmit it as in system 10. If necessary or desirable, a band pass reflector, such as reflector 24, can be placed between lamp 12 and phosphor coating 42 of mirror 44 to reflect 185 nm radiation back into lamp 12. With this high efficiency arrangement, reflectors such as 24 and 48 reflect 185 nm radiation back into lamp 12, reflect 254 nm radiation onto phosphor coating 42, and pass RGB radiation as uniform white light output 52. White light 52 can be used to provide back illumination for a liquid crystal cell or display 60, for example.

As described above, the present invention is a fluorescent lighting system that provides improvements in performance and lifetime over conventional fluorescent lamps. In particular, removing the phosphors from inside the lamp eliminates the damaging effect on the phosphors of collisions with Hg ions during lamp operations. With the phosphors external to the lamp, provision can also be made for reflecting 254 nm radiation onto the phosphors and reflecting 185 nm radiation back into the lamp for greater efficiency. The phosphors can be coated onto a plate or the surface of a mirror to provide uniform white light for a variety of applications. The high efficiency, long life, and uniform lighting characteristics of the present invention make it ideal for providing back illumination for liquid crystal displays.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

I claim:

1. A high efficiency, long life fluorescent lighting system, comprising:
   a gas discharge lamp having an inside surface without a phosphor coating, said lamp emitting ultraviolet radiation upon electrical discharge;
   a phosphor coating on a reflective surface external to said lamp for receiving said ultraviolet radiation and producing a white light output; and
   a band pass reflector for transmitting said white light output and reflecting said ultraviolet radiation onto said phosphor coated reflective surface.

2. The fluorescent lighting system of claim 1, wherein said lamp comprises a mercury vapor lamp, said mercury vapor enriched with $^{196}$Hg for emission of 254 nm wavelength radiation.

3. The fluorescent lighting system of claim 2, wherein said band pass reflector reflects said 254 nm wavelength radiation onto said phosphor coated reflective surface.

4. The fluorescent lighting system of claim 3, wherein the system comprises a source of back illumination for a liquid crystal display.

5. A high efficiency, long life fluorescent lighting system, comprising:
   a mercury vapor discharge lamp having an inside surface without a phosphor coating;
   said mercury vapor enriched with $^{196}$Hg for emission of 254 nm wavelength ultraviolet radiation and minimization of radiation of trapping upon electrical discharge;
   a phosphor coating on a reflective surface external to said lamp for receiving said 254 nm wavelength ultraviolet radiation and producing a white light output; and
   a band pass reflector for transmitting said white light output and reflecting said 254 nm wavelength ultraviolet radiation onto said phosphor coated reflective surface.

6. The fluorescent lighting system of claim 5, wherein the system is combined with a liquid crystal display and comprises a source of back illumination for said liquid crystal display.

7. A high efficiency, long life fluorescent lighting system, comprising:
   a gas discharge lamp having an inside surface without a phosphor coating, said lamp emitting ultraviolet radiation;
   a band pass reflector;
   means for directing said ultraviolet radiation to said band pass reflector, said band pass reflector transmitting 254 nm wavelength radiation and reflecting 185 nm wavelength radiation back to said lamp;
   a diffuser plate for receiving said transmitted 254 nm wavelength radiation, said diffuser plate having a band pass reflective coating on a surface facing toward said lamp and a phosphor coating on a surface facing away from said lamp;
   said band pass reflective coating on said diffuser plate transmitting 254 nm wavelength ultraviolet radiation through said diffuser plate to said phosphor coating;
   said phosphor coating receiving said 254 nm wavelength radiation and producing a white light output; and
   said band pass reflective coating reflecting said white light output.

8. The fluorescent lighting system of claim 7, wherein said lamp comprises a mercury vapor lamp, said mercury vapor enriched with $^{196}$Hg for emission of 254 nm wavelength ultraviolet radiation.

9. The fluorescent lighting system of claim 7 wherein said diffuser plate comprises a material that absorbs radiation at a wavelength of 185 nm.

10. The fluorescent lighting system of claim 7, wherein said system is combined with a liquid crystal display for providing back illumination for said liquid crystal display.

* * * * *